United States Patent
Wei

(10) Patent No.: US 11,703,094 B2
(45) Date of Patent: Jul. 18, 2023

(54) ACTUATION METHOD FOR A HYDRAULIC SYSTEM WITH A PUMP AND MULTIPLE VALVES, AND HYDRAULIC SYSTEM

(71) Applicant: Schaeffler Technologies AG & Co. KG, Herzogenaurach (DE)

(72) Inventor: Yunfan Wei, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 39 days.

(21) Appl. No.: 17/605,318

(22) PCT Filed: Mar. 25, 2020

(86) PCT No.: PCT/DE2020/100237
§ 371 (c)(1),
(2) Date: Oct. 21, 2021

(87) PCT Pub. No.: WO2020/216396
PCT Pub. Date: Oct. 29, 2020

(65) Prior Publication Data
US 2022/0186794 A1    Jun. 16, 2022

(30) Foreign Application Priority Data
Apr. 25, 2019   (DE) .................. 10 2019 110 710.5

(51) Int. Cl.
*F16D 48/02* (2006.01)
*F15B 11/16* (2006.01)
*F15B 11/028* (2006.01)

(52) U.S. Cl.
CPC ........ *F16D 48/0206* (2013.01); *F15B 11/028* (2013.01); *F15B 11/16* (2013.01);
(Continued)

(58) Field of Classification Search
CPC ...... F16D 25/10; F16D 25/14; F16D 48/0206; F16D 2048/0257; F16D 2048/0266;
(Continued)

(56) References Cited

U.S. PATENT DOCUMENTS 7,757,831 B2 * 7/2010 Stehr .................. F16D 48/066
  192/109 F
8,899,397 B2   12/2014 Ito et al.
(Continued)

FOREIGN PATENT DOCUMENTS

| CN | 87106712 A | 9/1988 |
| CN | 202125581 U | 1/2012 |

(Continued)

*Primary Examiner* — Michael Leslie

(57) ABSTRACT

A method actuates a hydraulic system for an actuation device of a motor vehicle. The hydraulic system has a pump and multiple valves which are each arranged between a system rail connected to a pump outlet and a hydraulic consumer. The pump is switched between a normal operation and an enhanced operation according to an existing total energy demand of the hydraulic consumers. In normal operation, the pump is driven when the system pressure is below a lower pressure threshold and switched off when the system pressure is above an upper pressure threshold. In the enhanced operation, the pump is permanently driven and each of the valves is operated according to an individual energy demand of the respective hydraulic consumer as soon as the system pressure achieves or exceeds a threshold value.

11 Claims, 4 Drawing Sheets

(52) U.S. Cl.
CPC .... *F16D 25/14* (2013.01); *F15B 2211/50536* (2013.01); *F15B 2211/55* (2013.01); *F15B 2211/565* (2013.01); *F16D 2048/0272* (2013.01)

(58) Field of Classification Search
CPC .............. F16D 2048/0269; F15B 11/16; F15B 11/161; F15B 11/165
See application file for complete search history.

(56) References Cited

U.S. PATENT DOCUMENTS

| | | | |
|---|---|---|---|
| 10,408,285 B2 * | 9/2019 | Herkommer | F15B 11/165 |
| 2007/0175726 A1 * | 8/2007 | Combes | F16D 25/10 192/85.37 |
| 2022/0205496 A1 * | 6/2022 | Wei | F16D 48/0206 |

FOREIGN PATENT DOCUMENTS

| | | | | |
|---|---|---|---|---|
| DE | 10150598 | A1 | 4/2003 | |
| DE | 10337556 | A1 | 3/2004 | |
| DE | 10340993 | A1 | 3/2005 | |
| DE | 102011122878 | A1 | 12/2014 | |
| DE | 102014208182 | A1 | 12/2014 | |
| DE | 102018130700 | A1 | 6/2020 | |
| DE | 102019123965 | A1 * | 3/2021 | ......... F16D 48/0206 |
| EP | 1451493 | B1 | 6/2006 | |
| EP | 2151586 | A2 | 2/2010 | |
| EP | 2375086 | A2 | 10/2011 | |

* cited by examiner

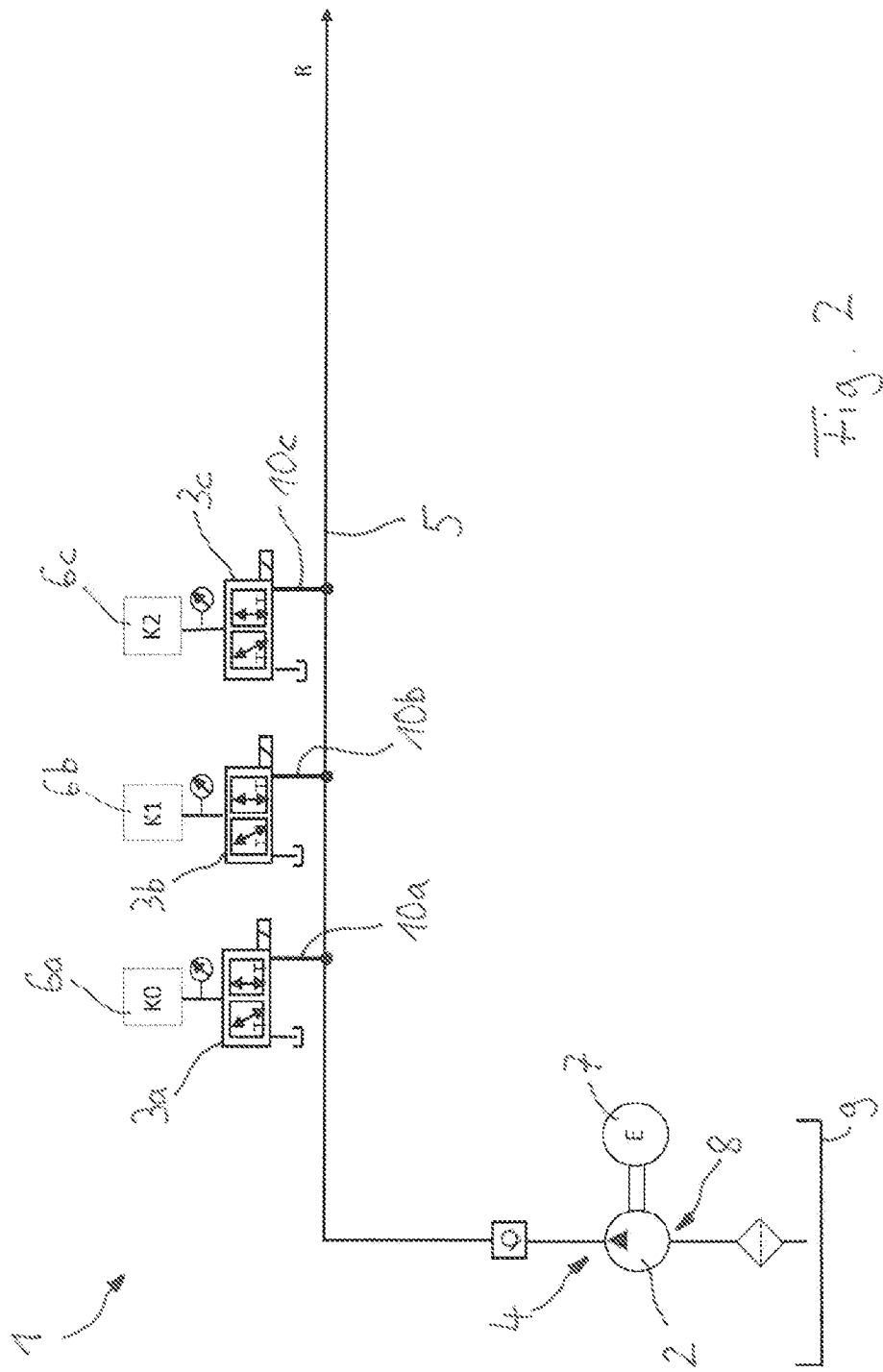

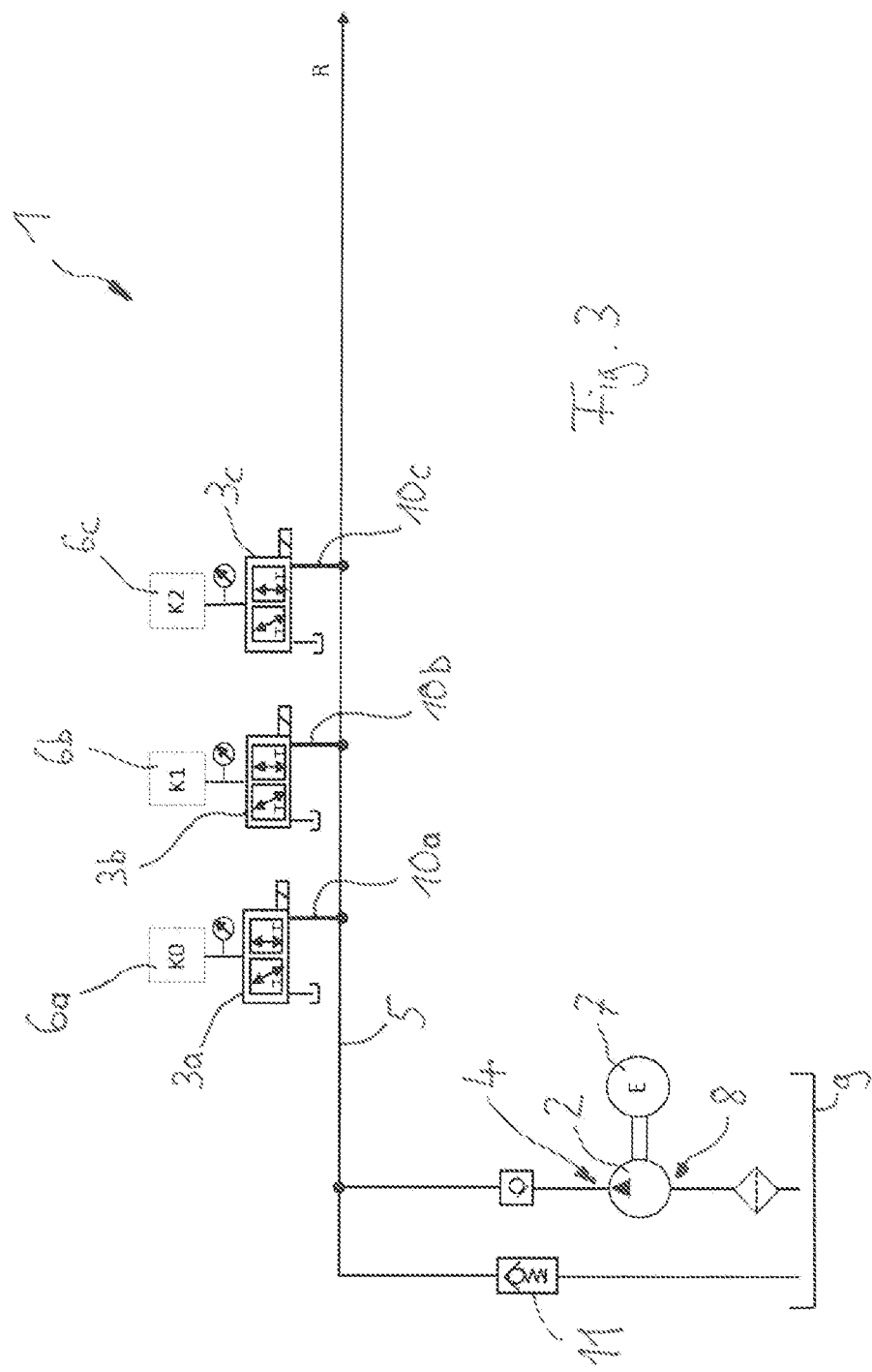

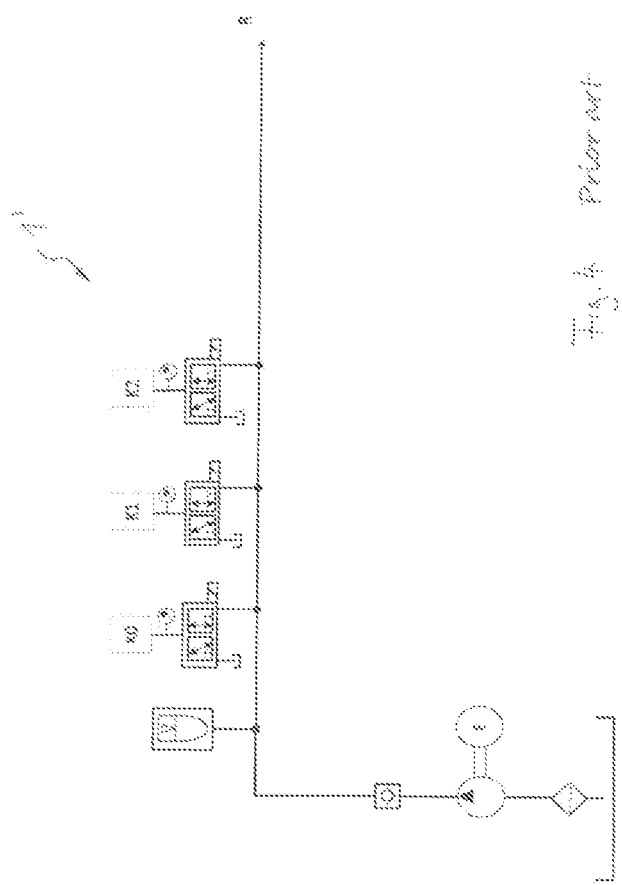

ACTUATION METHOD FOR A HYDRAULIC SYSTEM WITH A PUMP AND MULTIPLE VALVES, AND HYDRAULIC SYSTEM

CROSS-REFERENCE TO RELATED APPLICATIONS

This application is the U.S. National Phase of PCT Appln. No. PCT/DE2020/100237 filed Mar. 25, 2020, which claims priority to DE 10 2019 110 710.5 filed Apr. 25, 2019, the entire disclosures of which are incorporated by reference herein.

TECHNICAL FIELD

The disclosure relates to an actuation method for a hydraulic system for an actuation device of a motor vehicle, such as a car, truck, bus, or other commercial vehicle. The actuating device is preferably a clutch actuating device which has an actuating effect on a clutch of a drive train of the motor vehicle. The disclosure further relates to a hydraulic system which is designed to carry out this method.

BACKGROUND

Generic methods for actuating at least one clutch are known from the prior art, for example from DE10 2014 208 182 A1.

Further prior art of the generic type may be seen in connection with FIG. 4. A power pack system 1', which is primarily recognizable here, has a pressure accumulator which, during operation, is kept at a relatively high pressure level by means of a hysteresis control. Actuation of the pump can be implemented in a relatively simple manner using a so-called two-point controller and actuation of the individual valves can be decoupled from the pump control. However, this system has the disadvantage that, due to the existing pressure accumulator, a relatively high pressure is provided even in those operating states in which this high pressure is not required, since the individual hydraulic consumers K0, K1, K2 would get by with significantly lower pressure. As a result, a relatively large part of the energy previously fed into the pressure accumulator is lost again at a valve edge of the valve.

In addition, there are in principle hydraulic arrangements without pressure accumulators, but these systems often have the disadvantage that they are of relatively complex construction. The pump actuation must also be coordinated with the valve actuation as precisely as possible in order to avoid any restrictions on drivability.

SUMMARY

It is desirable to remedy the disadvantages known from the prior art and to provide the simplest possible and robustly functioning actuation strategy for the simplest possible construction of a hydraulic system.

A method for actuating a hydraulic system for an actuating device of a motor vehicle is proposed, the hydraulic system having a pump and multiple valves, which valves are each arranged between a system rail connected to a pump outlet and a hydraulic consumer. The pump is switched between normal operation and enhanced operation as a function of an existing total power requirement (determined at regular time intervals) of the hydraulic consumers. In normal operation, an existing system pressure in the system rail is determined at regular time intervals and a target pressure of the system rail is calculated; an upper pressure threshold and a lower pressure threshold are also established on the basis of the target pressure, the pump being driven when the system pressure is below the lower pressure threshold and switched off when the system pressure is above the upper pressure threshold. In the enhanced operation, however, the pump is permanently driven and each of the valves designed as pressure relief valves is operated at least temporarily as a function of an individual power requirement of the specific hydraulic consumer as soon as the system pressure reaches or exceeds a threshold value.

This enables a hydraulic system to dispense with a pressure accumulator and to actuate the pump and valves as independently as possible. This significantly simplifies the actuation of the hydraulic system.

Further advantageous embodiments are explained in more detail below.

Accordingly, it is also advantageous if, at least in normal operation, actuation of the valves is (completely) decoupled from actuation of the pump.

Furthermore, it is useful if the total power requirement (all hydraulic consumers) determining a switchover between normal operation and enhanced operation corresponds to a total volume flow requirement of all consumers, the enhanced operation being activated when the total volume flow requirement is above an upper volume flow threshold, and normal operation is activated when the total volume flow requirement is below a lower volume flow threshold value. This results in an even easier controllability of the hydraulic system.

In this regard, it is again advantageous if the upper volume flow threshold value and/or the lower volume flow threshold value are/is formed by a fixed constant or a temperature-dependent and/or system pressure-dependent variable. As a result, the control method is kept particularly simple.

It is also advantageous if the total volume flow requirement is calculated on the basis of a sum of a first partial volume flow requirement determined by a first hydraulic consumer and a second partial volume flow requirement determined by at least one further second hydraulic consumer, the specific partial volume flow requirement using a pressure-volume function stored in software is determined. In further versions, there are also more than two hydraulic consumers, each of which has a partial volume flow requirement. Accordingly, the total volume flow requirement is calculated on the basis of a sum of individual partial volume flow requirements/partial volume flow requirement values of more than two hydraulic consumers.

For the simplest possible pump actuation, it is also useful if a (fixed) maximum system voltage is applied to an electric motor driving the pump, both in normal operation and in enhanced operation.

To implement the enhanced operation, it is also useful if a pressure relief valve is integrated/arranged in the system rail.

It is also advantageous if the target pressure is a maximum value from the group of target consumer pressures required at the specific individual consumer. This allows the target pressure to be determined in a simple manner.

For the implementation of normal operation, it is also useful if the upper pressure threshold is calculated using a first load factor based on the target pressure and/or the lower pressure threshold is calculated using a second load factor based on the target pressure, the at least one load factor being a fixed constant or represents a temperature-dependent and/or system pressure-dependent variable.

A hydraulic system is designed to carry out the method described above.

In other words, an actuation method for a hydraulic arrangement (hydraulic system) with a pump and multiple valves is proposed. The basic idea is to identify an "event" with a high power requirement and to react to it in a targeted manner. Based on this idea, there are two modes of operation: Normal operation and event intervention (enhanced operation). In normal operation, the pump is controlled by means of a hysteresis control so that the system pressure is constantly kept at a sufficient level. For this purpose, the target pressure of the system rail is calculated in a first sub-step a). In a second sub-step b), an upper threshold and a lower threshold are calculated from the target pressure. In a third sub-step c) the pump is not driven when the system pressure is above the upper threshold and driven when the system pressure is below the lower threshold. In normal operation, the valve actuation is decoupled from the pump actuation. Each actuation is based only on the target requirements of individual consumers, e.g., the target pressure of a clutch. In the "event intervention" mode, the pump is constantly driven. The valve actuation remains unchanged for the time being. This means that the valve power supply or the applied valve voltage remains at the same level as at the time when the "event intervention" mode was activated. Only after the system pressure has reached a threshold value are these valves activated depending on the target demand of individual consumers.

BRIEF DESCRIPTION OF THE DRAWINGS

In the following, the control method is now explained in more detail with reference to figures.

In the Figures:

FIG. 2 shows a basic illustration of a hydraulic system according to a first exemplary embodiment, which can be actuated with the actuation strategy according to FIG. 1, FIG. 3 shows a basic illustration of a hydraulic system according to a second exemplary embodiment, which can also be actuated with the actuation strategy according to FIG. 1 and, compared to the first exemplary embodiment, is equipped with a pressure limiting valve, and FIG. 4 shows a basic illustration of a hydraulic system with a pressure accumulator designed according to the prior art.

Figure 1:
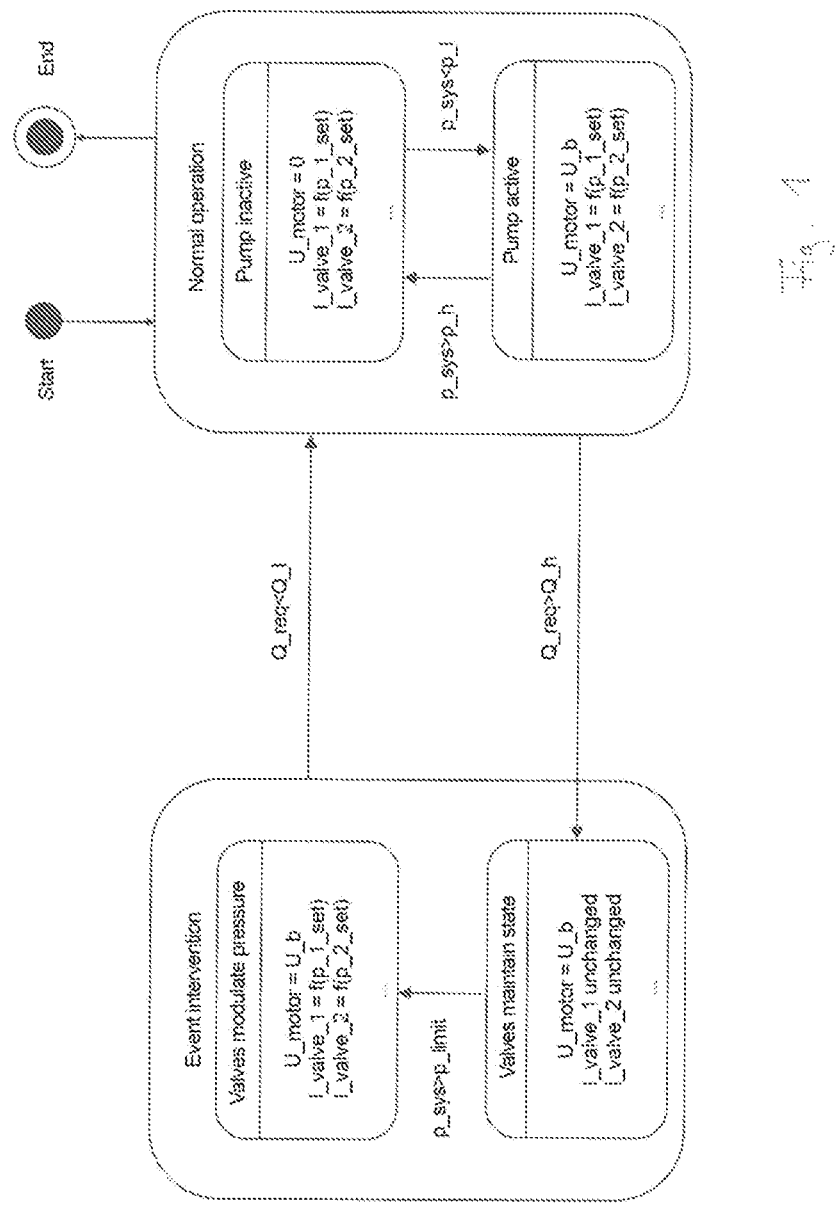
FIG. 1 shows a representation of a state machine to illustrate an actuation strategy of a hydraulic system.

The figures are only schematic in nature.

DETAILED DESCRIPTION

A hydraulic system 1, which is designed to carry out a method, has, according to a first exemplary embodiment, the structure shown in FIG. 2. In contrast to the hydraulic system 1' of the prior art, the hydraulic system 1 does not comprise a pressure accumulator. Multiple branches 10a, 10b, 10c branch off from the system rail 5, each of which can be connected to a hydraulic consumer 6a, 6b, 6c (K0, K1, K2) with the interposition of a valve 3a, 3b, 3c. The valves 3a to 3c assigned to the individual consumers 6a to 6c are each implemented as pressure regulating valves/pressure reducers. Also in a typical manner, as can be seen in connection with a further hydraulic system 1 according to a second embodiment in FIG. 3, a pressure limiting valve 11, may be incorporated in a system rail 5 connected to an output 4 of a pump 2.

As can also be seen in FIG. 2, the hydraulic system 1 is equipped with a pump 2 driven by an electric motor 7. The pump 2 is thus operated/controlled via the electric motor 7. The pump 2 is connected to a reservoir 9 with its input 8. The output 4 of the pump 2 is connected to the system rail 5. The branches 10a to 10c run from the system rail 5 to the valves 3a to 3c. The specific branch 10a to 10c is coupled to a hydraulic consumer 6a to 6c as a function of the position of the valve 3a to 3c. Accordingly, in this embodiment, a first branch 10a branching off from the system rail 5 can be coupled to a first hydraulic consumer 6a via a first valve 3a. Another, along the system rail 5 offset to the first branch 10a, second branch 10b can be coupled to a second consumer 6b via a second valve 3b. A third branch 10c, which in turn is offset from the two first and second branches 10a and 10b, can be coupled to a third consumer 6c via a third valve 3c. According to further embodiments, however, it is in principle also possible to provide fewer than three consumers 6a, 6b, 6c, such as only two consumers or more than three consumers. The consumers 6a, 6b, 6c are each part of an actuating device of a clutch (K0, K1, K2) of a drive train, for example in the form of a pressure cylinder.

The hydraulic system 1 shown in connection with FIG. 3 according to the second exemplary embodiment differs from the first exemplary embodiment only in the provision of the pressure limiting valve 11, which is connected to the system rail 5. The rest of the structure of the hydraulic system 1 according to FIG. 3 corresponds to the hydraulic system 1 according to FIG. 2.

A method for actuating the hydraulic system 1 is illustrated in connection with FIG. 1. The method can be implemented both with the hydraulic system according to FIG. 2 and with the hydraulic system according to FIG. 3.

The pump 2 can be switched between its normal operation and its enhanced operation as a function of an existing total power requirement (total volume flow requirement Q_req) of the hydraulic consumers 6a, 6b, 6c.

Normal operation is that operation of the pump 2 in which an existing system pressure p_sys is determined/measured in the system rail 5 at regular time intervals and a target pressure p_sys_set of the system rail 5 is calculated. The target pressure p_sys_set is that value which represents the highest pressure value to be set in the system. The target pressure p_sys_set is thus a maximum value from the group of consumer target pressures required at the specific individual consumer 6a, 6b, 6c. An upper pressure threshold p_h and a lower pressure threshold p_l are defined on the basis of the target pressure p_sys_set. The upper pressure threshold p_h and the lower pressure threshold p_l are calculated on the basis of an additional factor that represents a fixed constant or a temperature-dependent variable. The pump 2 is driven when the system pressure p_sys is below the lower pressure threshold p_l and switched off when the system pressure p_sys is above the upper pressure threshold p_h. Thus, in normal operation, a certain pressure level is always kept constant in the system rail 5 (between the lower pressure threshold p_l and the upper pressure threshold p_h). The pump 2 is switched between its switched-off and switched-on state in order to maintain this pressure level.

An additional enhanced operation of the pump 2 is implemented. This enhanced operation is activated when the total power requirement Q_req exceeds a certain power requirement. The total power requirement Q_req of all consumers 6a, 6b, 6c is determined as the total power requirement. The total volume flow requirement Q_req is a sum of partial volume flow requirements (V_1_req, V_2_req, . . . ) of all individual hydraulic consumers 6a, 6b, 6c at the specific point in time. The specific partial volume flow requirement is determined using a pressure-volume function stored in software. Accordingly, enhanced operation is activated/normal operation is deactivated when the total volume flow requirement Q_req is above an upper volume flow threshold value Q_h and normal operation is activated/enhanced operation is deactivated when the total volume flow requirement Q_req is below a lower volume flow threshold value Q_l. The upper volume flow threshold Q_h and the lower volume flow threshold Q_l are each calculated/derived either by a fixed constant or a temperature-dependent and system pressure-dependent variable.

In the enhanced operation, the pump 2 is then permanently driven. As already in the case when the pump 2 is driven in normal operation, the electric motor 7 is permanently driven with a fixed (maximum) voltage value (system voltage) in the enhanced operation. Each of the valves 3a, 3b, 3c designed as pressure relief valves is operated in the enhanced operation at least temporarily depending on an individual power requirement of the specific hydraulic consumer 6a, 6b, 6c as soon as the system pressure p_sys reaches or exceeds a threshold value p limit. In other words, the specific valve 3a, 3b, 3c is used for pressure reduction when the system pressure p_sys in the system rail 5 reaches or exceeds the threshold value p limit.

The valves 3a, 3b, 3c are typically fully decoupled/independent of an actuation of the pump 2/the electric motor 7.

In connection with FIG. 1, a typical calculation and determination of the specific values that implement the switchover are listed. A motor voltage is designated by U motor in this figure. A system voltage is designated with U b. A valve flow which actuates the specific valve 3a, 3b, 3c is designated by I_valve_1 (first valve 3a), I_valve_2 (second valve 3b). Since the specific valve 3a, 3b is implemented as a pressure relief valve, the valve flow I_valve_1, I_valve_2 is controlled by a function according to the corresponding target pressure that is to be implemented at the valve 3a, 3b (f (p_1_set); f (p_2_set)). When the limit pressure value/threshold value p limit is reached, the actuation of the valves 3a, 3b is switched over accordingly in the enhanced operation. This results in the following mathematical relationship:

Since conventional pressure relief valves are used, there is usually a mathematical relationship between the target pressure (p_1_set; p_2_set) according to the valve and the valve flow (I_valve_1; I_valve_2). This means that the pressure after valve 3a, 3b, 3c is controlled by the valve flow, i.e. I_valve=f (p_1_set) or p_1_set=f−1 (I_valve)

In order to use the actuation strategy that is visualized in FIG. 1, the following signal values must be determined for each time step i: 1. For the pressure interfaces, p_h and p_l of the pressure hysteresis-control must be determined mathematically as follows:

$$p\_sys\_set = \max(p\_1\_set, p\_2\_set, \ldots)$$

$$p\_h = p\_sys\_set \pm dp\_h$$

$$p\_l = p\_sys\_set \pm dp\_l$$

Here, dp_h and dp_l are stored constants or depend on the operating temperature and p_sys_set from a function/characteristic field. The following applies:

$$dp\_h > dp\_l > 0$$

and consequently $$p\_h > p\_l > p\_sys\_set$$

In order to know whether an event intervention, i.e., the activation of enhanced operation, is necessary, Q_req, Q_h and Q_l are determined mathematically:

$$Q\_req = (V\_1\_req + V\_2\_req + \ldots)/(ti - ti - 1)$$

with $$V\_1\_req = \max[(V\_1(p\_1\_seti) - V\_1(p\_1\_seti-1)), 0]$$

$$V\_2\_req = \max[(V\_2(p\_2\_seti) - V\_2(p\_2\_seti-1)), 0]$$

In a further preferred embodiment, Q_req is also determined mathematically as follows:

$$Q\_req = (V\_1\_req + V\_2\_req + \ldots)/(ti - ti - 1)$$

with $$V\_1\_req = \max[(V\_1(p\_1\_seti) - V\_1(p\_1\_acti)), 0]$$

$$V\_2\_req = \max[(V\_2(p\_2\_seti) - V\_2(p\_2\_acti)), 0]$$

The functions V_1 and V_2 are pressure-volume characteristics stored in software. Q_h and Q_l are constants or depend on the operating temperature and p_sys_set from a function/characteristic field. p_1_seti is a target pressure at the first hydraulic consumer 6a at a point in time i; p_2_seti is a target pressure at the second hydraulic consumer 6b at time i. Accordingly, p_1_seti−1 is a target pressure at the first hydraulic consumer 6a at a time i−1 and p_2_seti−1 is a target pressure at the second hydraulic consumer 6b at the time i−1. p_1_acti is an actually present (actual) pressure at the first hydraulic consumer 6a at time i and p_2_acti0 is an actually present (actual) pressure at the second hydraulic consumer 6b at time i.

The motor voltage U b to be applied is preferably a constant, but in further versions it is also calculated using a function/characteristic field of the operating temperature and p_sys_set. The motor voltage U b to be applied can also result directly from pressure regulation.

In other words, the basic idea is to identify an event with a high power requirement and to react to it in a targeted manner. Based on this idea, there are two modes of operation: Normal operation and event intervention (enhanced operation).

In order to assess whether a change must be made between normal operation and event intervention, the total volume flow requirement of all consumers 6a, 6b, 6c (Q_req) is calculated. If the value is above an upper threshold Q_h, the "event intervention" mode is activated. If the value is below a lower threshold Q_l, the "normal operation" mode is activated.

In order to simplify actuation in normal operation and in enhanced operation, the maximum available voltage is preferably always applied to the pump motor 7 when the pump 2 is to be driven. The system 1 preferably contains a pressure relief valve 11 on the system rail 5, which prevents an excessively high system pressure p_sys during the event intervention.

LIST OF REFERENCE SYMBOLS

1 Hydraulic system
2 Pump
3a First valve
3b Second valve
3c Third valve
4 Output
5 System rail 6a First consumer
6b Second consumer
6c Third consumer
7 Electric motor
8 Input
9 Reservoir
10a First junction
10b Second junction
10c Third junction
11 Pressure relief valve

The invention claimed is:

1. A method for actuating a hydraulic system for an actuation device of a motor vehicle, wherein the hydraulic system has a pump, multiple valves each arranged between a system rail connected to a pump outlet and at least one hydraulic consumer, wherein the pump is switched between a normal operation and an enhanced operation according to an existing total energy demand of the at least one hydraulic consumer, wherein, in normal operation, an existing system pressure in the system rail is determined at regular time intervals and a target pressure of the system rail is calculated, and an upper pressure threshold and a lower pressure threshold are established on the basis of the target pressure, wherein the pump is driven when the system pressure is below the lower pressure threshold and switched off when the system pressure is above the upper pressure threshold, and wherein, in the enhanced operation, the pump is continuously driven and each of the valves is operated according to an individual energy demand of the respective hydraulic consumer after the system pressure achieves a threshold value, wherein the total power requirement determining a switchover between normal operation and enhanced operation corresponds to a total volume flow requirement of all consumers, wherein the enhanced operation is activated when the total volume flow requirement is above and upper volume flow threshold value, and normal operation is activated when the total volume flow requirement is below a lower volume flow threshold value.

2. The method according to claim 1, wherein, in normal operation, actuation of the valves is decoupled from actuation of the pump.

3. The method according to claim 1, wherein the upper volume flow threshold value and the lower volume flow threshold value are formed by a fixed constant or a temperature-dependent and/or system pressure-dependent variable.

4. The method according to claim 1, wherein the total volume flow requirement is calculated based on the sum of a first partial volume flow requirement determined by a first hydraulic consumer and a second partial volume flow requirement determined by at least one further second hydraulic consumer, wherein the specific partial volume flow requirement is determined based on a pressure-volume function stored in software.

5. The method according to claim 1, wherein a maximum system voltage is applied to an electric motor driving the pump both in normal operation and in enhanced operation.

6. The method according to claim 1, wherein a pressure relief valve is arranged in the system rail.

7. The method according to claim 1, wherein the target pressure is a maximum value from a group of target consumer pressures required by a specific individual consumer.

8. The method according to claim 1, wherein the upper pressure threshold is calculated using a first load factor based on the target pressure and the lower pressure threshold is calculated using a second load factor based on the target pressure, wherein the at least one load factor is a fixed constant or a temperature-dependent and/or system pressure-dependent variable.

9. A method of controlling a hydraulic system, the hydraulic system including an electrically driven pump and a plurality of regulator valves feeding corresponding consumers, the method comprising:
in response to a total flow demand rising above an upper flow threshold, operating in an enhanced mode in which
the pump is driven with a first current level, and
the regulator valves are held steady until a system pressure exceeds a first pressure threshold, after which the regulator valves are operated based on pressure demands of the respective consumers; and
in response to the total flow demand falling below a lower threshold, operating in a normal mode in which
the regulator valves are operated based on the pressure demands of the respective consumers,
the pump is driven with the first current in response to the system pressure falling below a lower pressure threshold, and
the pump is turned off in response to the system pressure rising above an upper pressure threshold.

10. The method of claim 9, wherein the lower pressure threshold is calculated by adding a first increment to a maximum of pressure demands of the consumers and the upper pressure threshold is calculated by adding a second increment to the maximum of the pressure demands of the consumers.

11. A method for actuating a hydraulic system for an actuation device of a motor vehicle, wherein the hydraulic system has a pump, multiple valves each arranged between a system rail connected to a pump outlet and at least one hydraulic consumer, wherein the pump is switched between a normal operation and an enhanced operation according to an existing total energy demand of the at least one hydraulic consumer, wherein, in normal operation, an existing system pressure in the system rail is determined at regular time intervals and a target pressure of the system rail is calculated, and an upper pressure threshold and a lower pressure threshold are established on the basis of the target pressure, wherein the pump is driven when the system pressure is below the lower pressure threshold and switched off when the system pressure is above the upper pressure threshold, and wherein, in the enhanced operation, the pump is continuously driven and each of the valves is operated according to an individual energy demand of the respective hydraulic consumer after the system pressure achieves a threshold value, wherein the upper pressure threshold is calculated using a first load factor based on the target pressure and the lower pressure threshold is calculated using a second load factor based on the target pressure, wherein the at least one load factor is a fixed constant or a temperature-dependent and/or system pressure-dependent variable.

* * * * *